United States Patent
Lee et al.

(10) Patent No.: US 10,378,613 B1
(45) Date of Patent: Aug. 13, 2019

(54) ELECTRIC POWERTRAIN WITH CYCLOIDAL MECHANISM

(71) Applicant: SCHAEFFLER TECHNOLOGIES AG & CO. KG, Herzogenaurach (DE)

(72) Inventors: Brian Lee, York, SC (US); Peter Burke, Charlotte, NC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 8 days.

(21) Appl. No.: 15/890,613

(22) Filed: Feb. 7, 2018

(51) Int. Cl.
| | |
|---|---|
| *F16H 48/06* | (2006.01) |
| *F16H 1/32* | (2006.01) |
| *B60K 1/00* | (2006.01) |
| *B60K 17/16* | (2006.01) |
| *B60K 7/00* | (2006.01) |

(52) U.S. Cl.
CPC ............. *F16H 1/32* (2013.01); *B60K 1/00* (2013.01); *B60K 7/0007* (2013.01); *B60K 17/16* (2013.01); *F16H 48/06* (2013.01); *B60K 2001/001* (2013.01); *B60K 2007/0038* (2013.01); *F16H 2001/325* (2013.01)

(58) Field of Classification Search
None
See application file for complete search history.

(56) References Cited

U.S. PATENT DOCUMENTS

| | | | |
|---|---|---|---|
| 5,123,884 A | 6/1992 | Kondoh et al. | |
| 5,290,208 A * | 3/1994 | Minegishi | F16H 1/32 475/176 |
| 7,407,373 B2 | 8/2008 | Ogata et al. | |
| 9,914,349 B2 * | 3/2018 | Kuroda | B60K 17/14 |
| 2011/0082000 A1 * | 4/2011 | Makino | B60K 1/00 475/149 |
| 2012/0329597 A1 * | 12/2012 | Nomura | F16H 1/32 475/150 |
| 2013/0143707 A1 * | 6/2013 | Suzuki | F16H 1/32 475/149 |
| 2013/0178322 A1 * | 7/2013 | Takuno | F16H 1/32 475/178 |
| 2013/0257202 A1 * | 10/2013 | Takuno | H02K 7/116 310/83 |
| 2013/0260941 A1 * | 10/2013 | Nomura | F16H 37/08 475/150 |
| 2014/0018202 A1 * | 1/2014 | Nomura | F16H 1/32 475/149 |
| 2015/0099600 A1 * | 4/2015 | Nilsson | B60L 50/16 475/150 |

* cited by examiner

*Primary Examiner* — Justin Holmes
(74) *Attorney, Agent, or Firm* — Brooks Kushman P.C.

(57) ABSTRACT

An electric powertrain for a vehicle includes a cycloidal speed reducer having an input member configured to couple with a traction motor, a cycloidal disc defining a plurality of circumferentially arranged holes, and a plurality of circumferentially arranged pins each disposed in one of the holes. A differential of the vehicle has a case connected to each of the pins. The differential may be a cycloidal differential.

18 Claims, 5 Drawing Sheets

US 10,378,613 B1

ELECTRIC POWERTRAIN WITH CYCLOIDAL MECHANISM

TECHNICAL FIELD

The present disclosure relates to electric powertrains for vehicles, and more specifically to electric powertrains that include one or more cycloidal mechanisms utilized as part of a gearbox, a differential, or both.

BACKGROUND

Vehicles are more commonly including electric powertrains to improve fuel economy and reduce emissions. Electric powertrains utilize a traction motor to power driven wheels of the vehicle. The traction motor may be used in conjunction with an internal-combustion engine in hybrid vehicles. The traction motor is powered by a traction battery, fuel cell, or other electrical power source.

Electric motors produce usable torque over a broader range of speeds than engines and typically do not require a multi-speed gearbox. Instead, electric powertrains typically include a one-speed gearbox that reduces shaft speed and multiplies torque for the driven wheels. A typical one-speed gearbox includes an input shaft fixed to motor, an output element (such as a ring gear), and a layshaft meshing between the input shaft and the output element.

SUMMARY

According to one embodiment, an electric powertrain for a vehicle includes a cycloidal speed reducer having an input member configured to couple with a traction motor, a cycloidal disc defining a plurality of circumferentially arranged holes, and a plurality of circumferentially arranged pins each disposed in one of the holes. A differential of the vehicle has a case connected to each of the pins. The differential may be a cycloidal differential.

According to another embodiment, an electric powertrain for a vehicle includes a traction motor having a stator, a rotor, and an output shaft fixed to the rotor. A cycloidal speed reducer is coupled to the traction motor and includes a ring-pin assembly rotationally fixed with the stator, encircling the output shaft, and having a plurality of circumferentially arranged ring pins. The speed reducer further includes an eccentric cam received on the output shaft, and a cycloidal disc defining a central hole that receives the eccentric cam and a plurality of lobes circumferentially arranged around an outer surface of the disc and configured to engage with the ring pins.

According to yet another embodiment, an electric axle includes a traction motor having a motor output shaft and a cycloidal speed reducer coupled to the motor output shaft. The cycloidal speed reducer includes a cycloidal disc configured to have an eccentric, cycloidal motion that rotates slower than the motor output shaft. A differential of the axle has a case connected to the cycloidal disc and connected to first and second differential output shafts.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
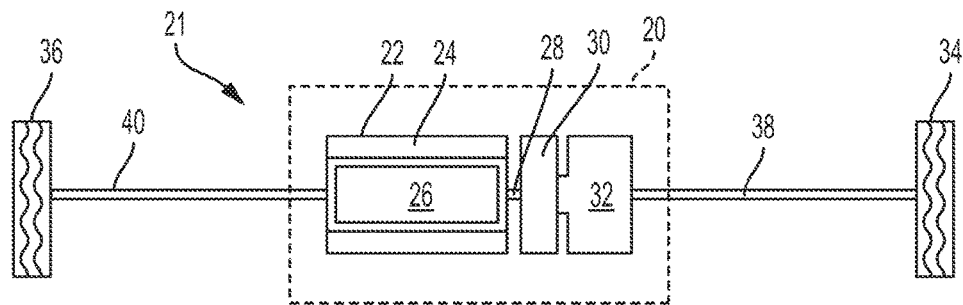
FIG. 1 is a schematic diagram of an electronic axle.

Referring to FIG. 1, an electric powertrain 20 may be used to power driven wheels of an electrified vehicle, such as a passenger car, truck, sport-utility vehicle, or crossover. In the illustrated embodiment, the electric powertrain 20 is part of an electric axle (e-axle) 21 that may be used as a front or rear drive axle of the electrified vehicle. In other embodiments, the electric powertrain 20 may be packaged as part of a hybrid transmission.

The powertrain 20 includes an electric machine 22, typically called a traction motor, that produces drive torque. The traction motor 22 may also act as a generator, such as during regenerative braking. The traction motor 22 may be powered by a traction battery (not shown). The traction motor 22 includes a stator 24 and a rotor 26 supported for rotation within the stator 24. An output shaft 28 of the traction motor 22 is rotationally fixed to the rotor 26. An end portion of the output shaft 28 is coupled to a speed reducer 30 configured to reduce speed of the output shaft 28 creating torque multiplication. An output member of the speed reducer 30 is coupled to a differential 32 configured to distribute the motor power between the first wheel 34 and the second wheel 36. The differential 32 is also configured to permit speed differences between the first and second wheels 34, 36 to facilitate cornering of the vehicle. A first half shaft 38 connects the differential 32 to the first wheel 34, and a second half shaft 40 connects the differential 32 to the second wheel 36. Used herein "half shaft" refers to any shaft that transmits power from a differential to a driven wheel.

Figure 2:
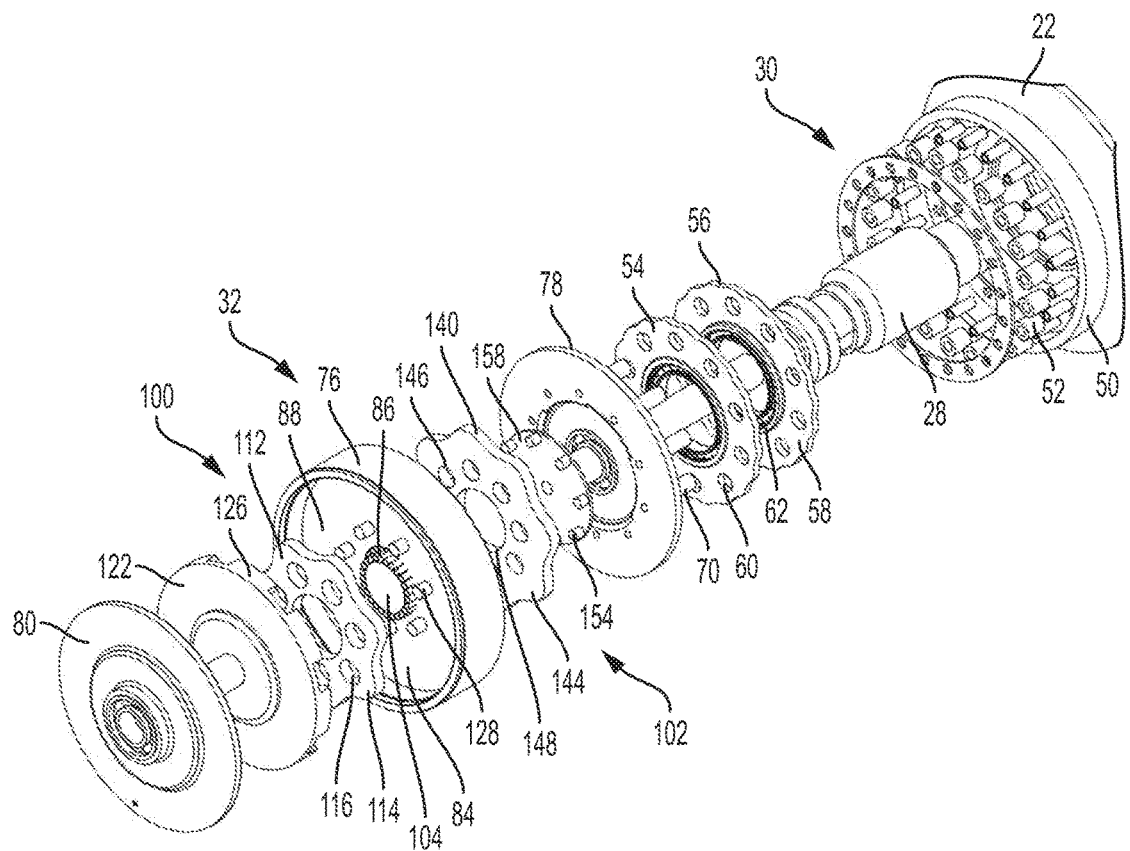
FIG. 2 is an exploded view of an electric powertrain of the electronic axle.
Figure 3:
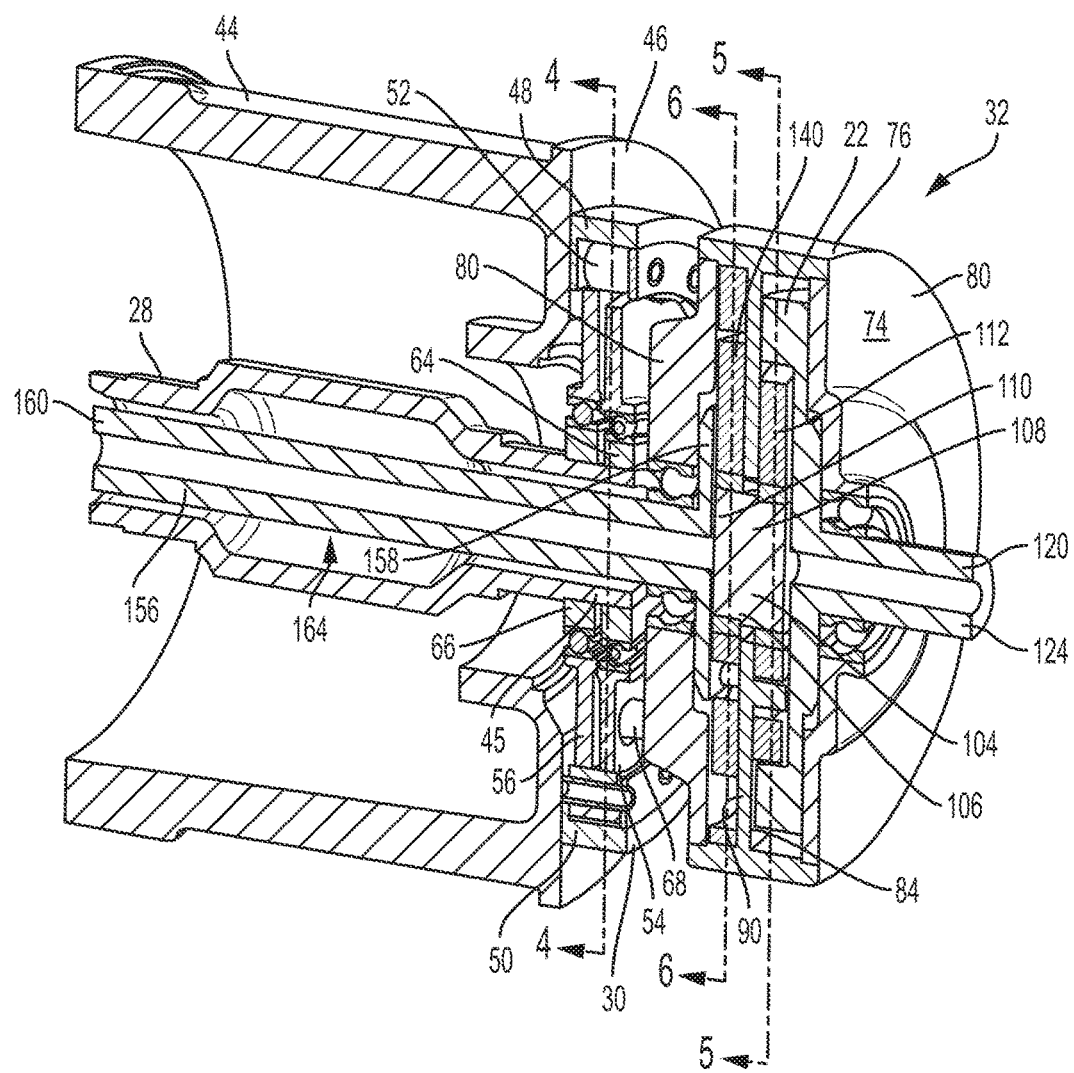
FIG. 3 is a perspective view, in cross section, of the electric powertrain.
Figure 4:
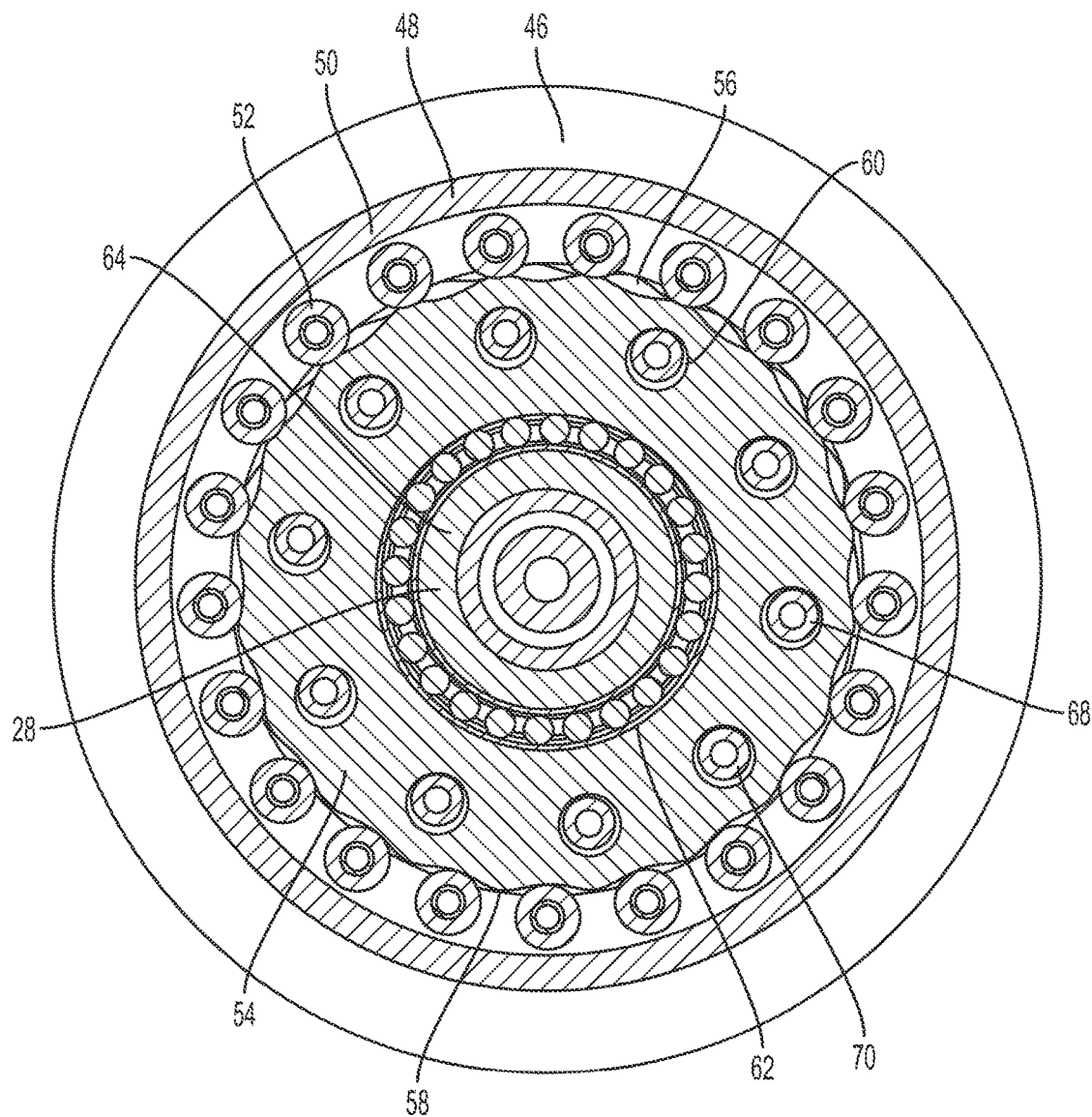
FIG. 4 is a cross-sectional view of a speed reducer of the electric powertrain along cutline 4-4.

Referring to FIGS. 2, 3, and 4 the traction motor 22 includes a housing 44 having the stator 24 and the rotor 26 therein. The output shaft 28 is supported for rotation within the housing 44 and includes an end portion 45 that extends past an end face 46 of the housing 44. The stator 24 is rotationally fixed to the housing 44 and the rotor 26 is supported on the output shaft 28 so that the rotor 26 may rotate within the housing 44.

The end portion 45 connects with an input member of the speed reducer 30. The speed reducer 30 may be a cycloidal speed reducer as illustrated. The speed reducer 30 may include a ring-pin assembly 48 mounted on the end face 46 rotationally fixed to the housing 44. The ring-pin assembly 48 may include an annular retainer 50 that supports a plurality of ring pins 52 circumferentially arranged around the retainer 50. The ring pins 52 may be configured to rotate relative to the retainer 50. For example, the ring pins 52 may include rotatable bushings or roller bearings that are supported by posts fixed to the retainer 50. The ring-pin assembly may have twenty-one ring pins 52.

The speed reducer 30 may also include at least one cycloidal disc radially disposed between the output shaft 28 and the ring-pin assembly 48. In the illustrated embodiment, two cycloidal discs 54 and 56 are used to reduce loads and provide balance. The first and second cycloidal discs 54, 56 each defines lobes 58 forming the circumferential perimeter of the disc, circular holes 60 circumferentially arranged and extending through the disc, and a central bore 62. The number of lobes 58 may be one less than the number of ring pins 52, and the number of holes 60 may be less than the number of lobes 58. In the illustrated embodiment, each disc 54, 56 has 20 lobes and 10 holes. In other embodiments, however, the number of ring-pins, lobes, and holes may be increased or decreased to change the speed reduction and other characteristics.

The cycloidal discs 54, 56 are supported by eccentric cams 64, 66, which are the input members of the speed reducer 30. (If one cycloidal disc is used, then a single eccentric cam is used.) The eccentric cams 64, 66 are seated on the end portion 45 of the output shaft 28 with the cams 64, 66 rotationally fixed to the shaft 28. The first cam 64 is received in the central bore 62 of the first disc 54, and the second cam 66 is received in the central bore 62 of the second disc 56. The cams 64, 66 may be arranged on the shaft 28 with a phase difference between the cycloidal discs 54, 56. The phase difference may be between 170 and 200 degrees, and more preferably 180 degrees, to increase balance of the speed reducer 30. Bearings may be disposed between the central bores and the cams to reduce friction.

The eccentric cams 64, 66 input eccentric rotation into the cycloidal discs 54, 56, and the lobes 58 engage with the ring pins 52 to create an eccentric, cycloidal motion (also known as orbital or wobbling motion) of the disc 54, 56, which reduces the angular speed of the discs 54, 56 relative to the output shaft 28. The gear ratio of the speed reducer is equal to the number of ring pins minus one. In the illustrated embodiment, the speed reducer 30 includes 21 ring pins 52 creating a 20:1 ratio.

The speed reducer 30 further includes an output element 68 having a plurality of circumferentially arranged pins 70. The number of holes 60 and the number of pins 70 is equal. The illustrated embodiment includes ten holes 60 in each disc and ten pins 70. The discs 54 and 56 are arranged so that corresponding holes 60 are aligned allowing each pin 70 to extend though both discs 54, 56. The diameter of the pins 70 is less than the diameter of the holes 60 so that only a portion of the pins 70 are in contact with a portion of the holes 60. This facilitates the eccentric, cycloidal motion of the discs 54, 56 and gives the output element 72 concentric rotation.

The output element 68 is either coupled to a case 74 of the differential 32 or is a portion of the case 74. The case 74 is supported for rotation relative to the housing 44. The traction motor 22, the speed reducer 30, and the differential 32 may be coaxial. A cover (not shown) may be attached to the housing 44 and covers the speed reducer 30 and the differential 32. The cover may include features that support the differential 32. The case 74 may include a ring portion 76, a first end portion 78 that faces the speed reducer 30, and a second end portion 80. In the illustrated embodiment, the output element 68 is integrated with the case 74. The pins 70 extend from the first end portion 78 to couple the case 74 to the cycloidal disc 54, 56. The pins 70 may be integrally formed with the first end portion 78 or may be separate components that are connected to the end portion 78 by fasteners, welding, or other known attachment means. The pins 70 may be configured to rotate relative to the case 74 to reduce friction and provide smoother operation.

Cycloidal speed reducers are smaller than gearboxes having spur or planetary gear sets. Packing space on vehicles is limited, especially for electronic axle applications, and using cycloidal speed reducers provides additional space for other components such as the traction motor. Cycloidal speed reducers are also capable of higher speed reduction, and inversely a higher torque multiplication, than spur or planetary gear sets of similar size. This enables a lower-torque, higher-speed motor to produce a same amount of power at the driven wheels. Lower-torque, higher-speed motors tend to be smaller and may be more economical. Cycloidal speed reducers also enable the powertrain 20 to be co-axial, whereas spur gears typically require the input and output shafts of the gearbox to be offset.

The differential 32 is configured to transmit torque produced by the traction motor, as multiplied by the speed reducer 30, to the driven wheels 34, 36. Many types of traditional differentials are known such as bevel-gear differentials, planetary differentials, spur-gear differentials, and the like, and the differential 32 may be of these types in some embodiments. These traditional types, however, tend to be bulky requiring sizable packaging space.

Recently, Applicant has developed a new type of differential called a cycloidal differential. Cycloidal differentials are compact and require less packaging space than traditional differentials. Cycloidal differentials are disclosed in Applicant's co-pending U.S. patent application Ser. Nos. 15/864,442, 15/864,460, and 15/864,492 which are incorporated in their entirety by reference herein. These cycloidal differentials can be rearranged and combined with each other to form other types of cycloidal differentials.

Figure 5:
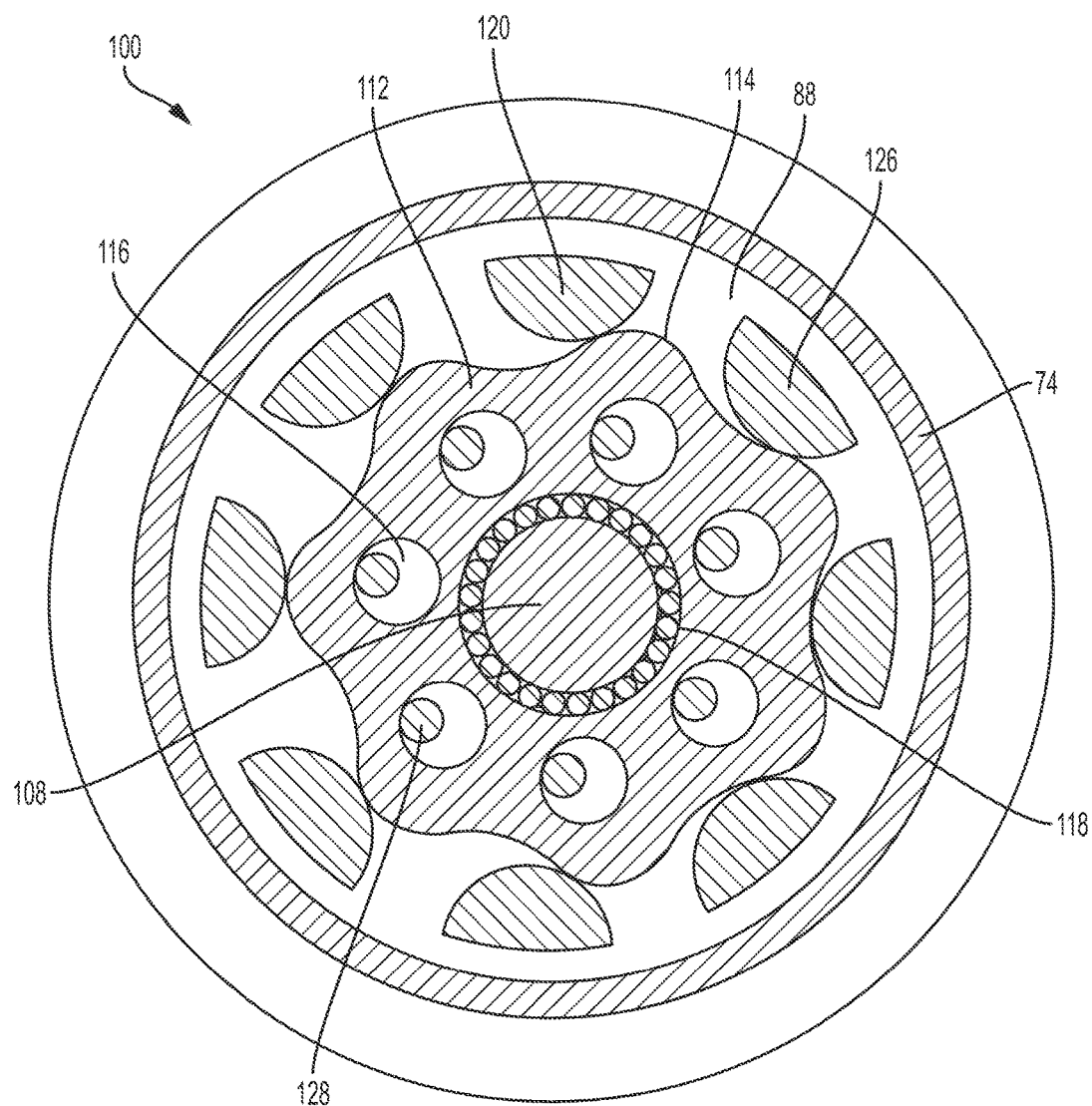
FIG. 5 is a cross-sectional view of a cycloidal differential of the electric powertrain along cutline 5-5.
Figure 6:
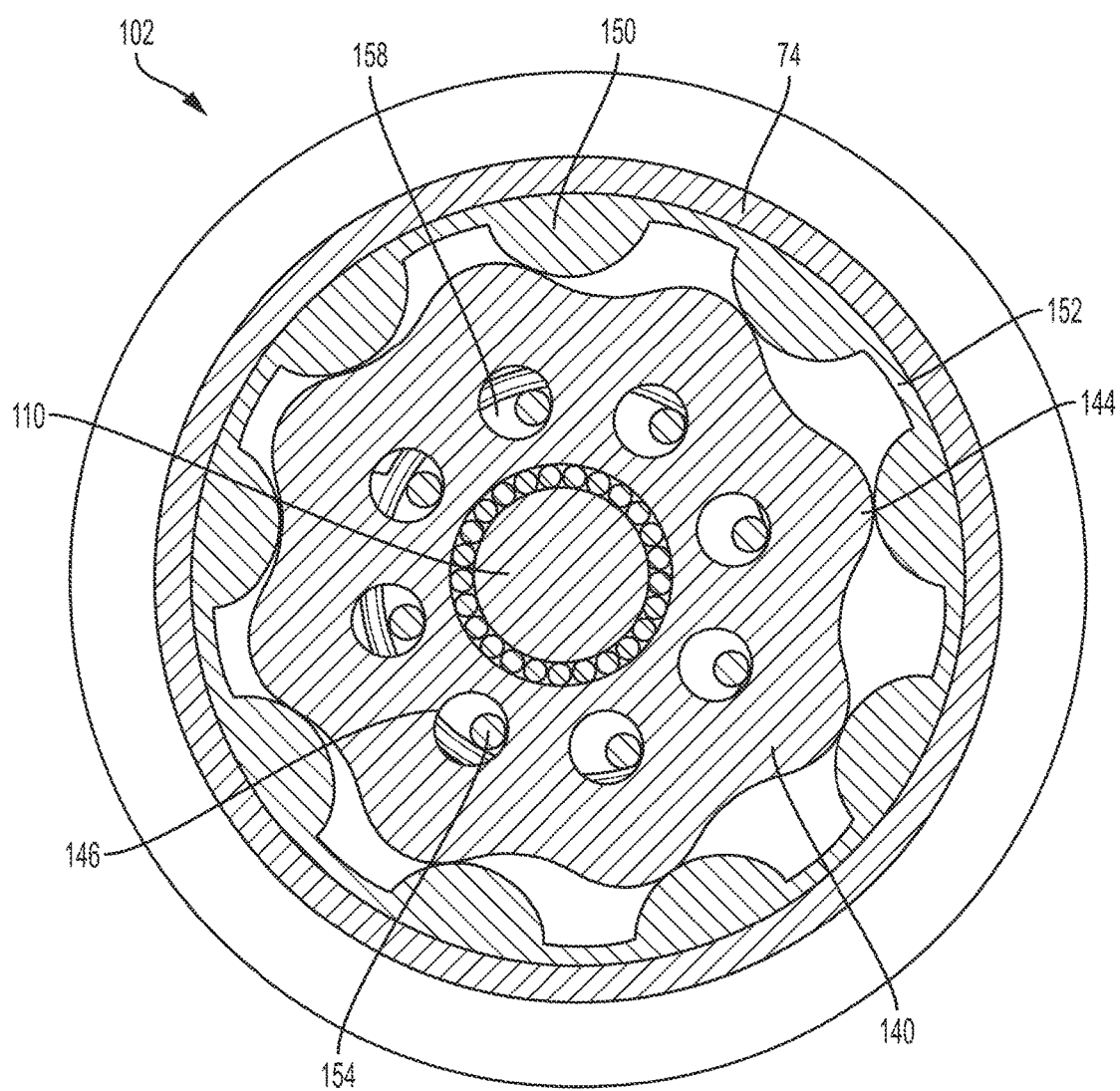
FIG. 6 is a cross-sectional view of the cycloidal differential along cutline 6-6.

Referring to FIGS. 3, 5, and 6, the differential 32 is a cycloidal differential in the illustrated embodiment. The cycloidal differential 32 may include a first drive 100 associated with the first half shaft 38 and a second drive 102 associated with the second half shaft 40. The case 74 of the differential 32 may include an intermediate wall 84, and the first and second drives 100, 102 may be disposed on opposite sides of the intermediate wall 84. The intermediate wall 84 defines a central bore 86 allowing one or more components to extend through the wall 84 to interconnect the drives 100, 102.

Each of the cycloidal drives 100, 102 have an output member configured to connect with one of the half shafts to supply power from the differential 32 to the driven wheels 34, 36. The differential 32 includes a coupling element that interconnects the first and second cycloidal drives 100, 102. The differential 32 is configured so that the output members, the coupling element, and the case 74 rotate at the same speed when the vehicle is traveling in a straight line. During a turn, the outside output member rotates faster than the case 74 and the inside output member rotates slower than the case 74, and the coupling element rotates faster than both of the output members making the differential 32 a hyper-cycloidal differential. In other embodiments, the differential 32 is a hypo-cycloidal differential in which the coupling element rotates slower than both of the output members.

The coupling member may be an eccentric shaft 104 having a circular portion 106 that is supported within the case 74. For example, a bearing may be interposed between the circular portion 106 and the central bore 86 to support the eccentric shaft 104 for rotation within the case 74. The eccentric shaft 104 may also have opposing eccentric discs 108 and 110 disposed on opposite ends of the shaft. The first cycloidal drive 100 may be connected to the first disc 108, and the second cycloidal drive 102 may be connected to the second disc 110. The first and second discs 108, 110 may have different center points creating a phase difference. The phase difference between the first and second discs may be between 170 and 200 degrees. In the illustrated embodiment, the phase difference is 180 degrees. A phase difference between the discs may not be required in all applications.

The first cycloidal drive 100 includes a cycloidal disc 112 (also known as a cycloidal cam) having lobes 114 forming the circumferential perimeter of the disc and circular holes 116 circumferentially arranged and extending through the disc 112. The number of lobes 114 and the number of holes 116 may be equal. In the illustrated embodiment, the disc 112 has seven lobes and seven holes. The cycloidal disc 112 defines a bore 118 that is seated on the first eccentric disc 108. A bearing may be interposed between the disc 108 and the bore 118.

An output member 120 of the first drive 100 may include a flange portion 122 and a shaft portion 124. The shaft portion 124 may define splines or other features used to connect the output member 120 and the first half shaft 38. The disc 112 is connected to the output member 120 via a plurality ring pins 126 (also known as rollers). The ring pins 126 are circumferentially arranged on the flange portion 122 such that the ring pins 126 engage with the lobes 114 of the disc 112. The ring pins 126 may be stationary with respect to the flange portion 122 or may be rotatable about their axes. The ring pins 126 may be integrally formed with the flange portion 122.

Pins 128 (sometimes called rollers) of the first drive 100 may be attached to a first side 88 of the intermediate wall 84 by fasteners, welding or the like, or be integrally formed. The pins 128 are circumferentially arranged on the first side 88 so that the pins 128 are received within the holes 116 of the disc 112. The diameter of the pins 128 is less than the diameter of the holes 116 to facilitate the eccentric, cycloidal motion of the disc 112. The pins 128 revolve with the case 74 and are the input members of the first cycloidal drive 100. The drive 100 may include one more roller pin 126 than pins 128. In the illustrated embodiment, the drive 100 includes seven pins 128 and eight ring pins 126.

Similar to a planetary gear set, if one of the pins 128, output member 120, and eccentric shaft 104 is held static, then the other two components will rotate relative to each other at different speeds. For example, if the output member 120 is held static, the eccentric shaft 104 and the case 74 will rotate in opposite directions and at different speeds. In the illustrated embodiment, the case 74 will rotate eight times slower than the eccentric shaft 104.

The second cycloidal drive 102 includes a cycloidal disc 140 having lobes 144, circular holes 146, and a bore 148. The cycloidal disc 140 is supported by the eccentric shaft 104 with the bore 148 seated on the second eccentric disc 110. A bearing may be interposed between the disc 140 and the bore 148. In the illustrated embodiment, the disc 140 includes eight lobes 144 and eight holes 146.

The second cycloidal drive 102 also includes a plurality of ring pins 150 attached to the case 74 or integrally formed with the case 74. The ring pins 150 may be fixed or rotatable about their axes. The differential 32 may include a ring-pin plate 152 that defines the ring pins 150, which are circumferentially arranged around an inner surface of the plate 152.

The ring pins 150 are circumferentially arranged to receive the disc 140 with the ring pins 150 engaging the lobes 144 to facilitate the eccentric, cycloidal motion of the disc 140. The number of ring pins 150 may be one more than the number of lobes 144. In the illustrated embodiment, the drive 102 includes eight lobes 144 and nine ring pins 150. The ring pins 150 are attached to the case 74 and are the input member of the second drive 102.

Pins 154 of the second drive 102 may be attached to an output member 156. The output member 156 may include a flange portion 158 and a shaft portion 160. The shaft portion 160 may define splines configured to connect with the second half shaft 40. The pins 154 are circumferentially arranged on the flange portion 158 so that the pins 154 are received within the holes 146 of the second cycloidal disc 140. A diameter of the pins 154 is smaller than the diameter of the holes 146 to facilitate the eccentric, cycloidal motion of the disc 140. The number of pins 154 may be one less than the number of ring pins 150. In the illustrated embodiment, the second drive 102 includes eight pins and nine ring pins.

The output member 156 is supported by the second end portion 80. The end portion 80 defines a hole 162, and the shaft portion 160 extends through the hole 162. A bearing may be interposed between the hole 162 and the shaft portion 160. The shaft portion 160 may extend through a hollow center 164 of the motor output shaft 28 so that the output member 156 may connect with the second half shaft 40.

Similar to the first drive 100, if one of the case 74, output member 156, and eccentric shaft 104 is held static, then the other two components will rotate relative to each other at different speeds. For example, if the case 74 is held static, the eccentric shaft 104 and the output member 156 will rotate in opposite directions and at different speeds. In the illustrated embodiment, the output member 156 will rotate eight times slower than the eccentric shaft 104.

In the illustrated embodiment, the first cycloidal drive 100 is a seventh-order drive (disc 112 has seven lobes) and the second cycloidal drive 102 is an eighth-order drive (disc 140 has eight lobes). By having one of the drives of m order and the other of m+1 order, the speed ratios between the output members 120, 156 are equal. While illustrated as having a seventh-order drive and an eighth-order drive, the differential 32 may have any combination of an m order drive and an m+1 order, where m is greater than or equal to 2.

Cycloidal differentials are configured to rotationally lock the first and second drives 100, 102 to the case 74, i.e., the cycloidal components within the case 74 do not rotate relative to the case 74, during straight line driving. Cycloidal differentials are further configured to, during cornering, allow relative movement of the components of the first and second drives 100, 102 during cornering to provide a 1:−1 ratio between the output members 120, 156.

During straight-line driving of the vehicle, the output members 120 and 156 are rotating at the same speed, e.g., in the clockwise direction, and the case 74 rotates at the same speed as the output members. During straight-line driving, and the first drive 100 urges the first disc 112 to rotate in the clockwise direction, and the second drive 102 urges the second disc 140 to rotate in the counterclockwise direction. Since the first and second discs are fixed to the same shaft 104, rotation in the opposite direction is not possible. Thus, the eccentric shaft 104 locks the first and second drives 100, 102 relative to each other causing the output member 120 and the output member 156 to rotate in the same direction, which is in unison with the case 74. The eccentric shaft 104 locks the output members 120, 156 due to an equal number of ring pins 126 and pins 154.

Assuming that the case 74 is held static and the first and second output members 120 and 156 receive an equal amount of torque in the clockwise direction, torque of the output member 120 urges the ring pins 126 to revolve around a centerline of the differential 32. This urges the disc 112 to have a counterclockwise eccentric, cycloidal motion. The cycloidal disc 112 urges the first eccentric disc 108 to rotate in the clockwise direction.

In the second drive 102, the clockwise torque of the output member 156 urges the pins 154 to revolve in the clockwise direction around the centerline. The pins 154 urge the cycloidal disc 140 to rotate in the clockwise direction, which urges the second eccentric disc 110 to rotate in the counterclockwise direction. Thus, the first and second eccentric discs 108, 110 are urged in opposite directions. The shaft 104 prevents this causing the differential 32 to lock up, i.e., none of the individual components of the differential rotate relative to each other. Instead, all of the individual components rotate/revolve with the case 74. Thus, when the vehicle is driving in a straight line, the output members 120, 156, the shaft 104, and the case 74 rotate at the same speed and in the same direction.

During cornering of the vehicle, the output members 120 and 156 rotate at different speeds. Assume for this example that the output member 156 is connected to the inner wheel, and the output member 120 is connected to the outer wheel.

Normally, rotation is transferred from the case 74 into the pins 128 of the first drive 100 and into the ring pins 150 of the second drive 102 causing the output members 120 and 156 to rotate. During a corner, however, the output member 120 is rotating faster than the case 74 and is inputting rotation into the differential 32. The clockwise rotation of the output member 120, i.e., increased angular speed, causes counterclockwise eccentric, cycloidal motion of the disc 112 due to rolling engagement between the ring pins 126 and the lobes 114. The counterclockwise eccentric, cycloidal motion of the disc 112 causes the eccentric shaft 104 to rotate clockwise. The first drive 100 is arranged such that a speed multiplication occurs between the output member 120 and the eccentric shaft 104. In the illustrated embodiment, the eccentric shaft 104 rotates eight times faster than the output member 120.

Rotation of the eccentric shaft 104 in the clockwise direction causes counterclockwise eccentric, cycloidal motion of the disc 140. The disc 140 causes the pins 154 to revolve in the counterclockwise direction about the centerline of the differential, which in turn, causes the output shaft 156 to rotate in the counterclockwise direction. The output member 156 rotates eight times slower than the eccentric shaft 104 in the illustrated embodiment. The counterclockwise direction of the output member 156 is being used as a relative term meaning that the output member 156 is rotating slower than the case 74 and the output member 120. In reality, both of the output members 120 and 156 rotate in the same direction, which is also the same direction of rotation as the case 74, but at different speeds.

This application is not limited to the above illustrated and described cycloidal differential, and it is to be understood that other embodiments, such as those disclosed in any of Applicant's co-pending applications, may be used in the powertrain 20.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electric powertrain for a vehicle comprising:
    a cycloidal speed reducer including an input member configured to couple with a traction motor, a cycloidal disc defining a plurality of circumferentially arranged holes, and a plurality of circumferentially arranged pins each disposed in one of the holes; and
    a cycloidal differential including a case connected to each of the pins.

2. The electric powertrain of claim 1, wherein the input member is an eccentric cam, and the cycloidal disc defines a central hole that receives the eccentric cam and a plurality of lobes circumferentially arranged around an outer surface of the disc.

3. The electric powertrain of claim 1, wherein the cycloidal speed reducer further includes a ring-pin assembly configured to be rotationally fixed with a stator of the traction motor and encircling the cycloidal disc, the assembly having a plurality of circumferentially arranged ring pins configured to engage with the lobes.

4. The electric powertrain of claim 1, wherein the cycloidal disc is a pair of discs that have a phase difference between 170 and 200 degrees, inclusive.

5. The electric powertrain of claim 1, wherein the cycloidal differential includes:
    a first cycloidal drive having a first input member rotationally fixed to the case and a first differential output configured to connect with a first half shaft,
    a second cycloidal drive having a second input member rotationally fixed to the case and a second output member configured to connect with a second half shaft, and
    a coupling element connected between the first and second drives.

6. The electric powertrain of claim 5, wherein the first and second drives further have first and second cycloidal discs, respectively, that each define lobes and holes.

7. The electric powertrain of claim 6, wherein the first disc defines m number of lobes, and the second disc defines m+1 number of lobes.

8. The electric powertrain of claim 1 further comprising a traction motor including a stator, a rotor, and an output shaft fixed to the rotor, wherein the input member is coupled to the output shaft.

9. An electric powertrain for a vehicle comprising:
a traction motor including a stator, a rotor, and an output shaft fixed to the rotor; and
a cycloidal speed reducer coupled to the traction motor and including:
a ring-pin assembly rotationally fixed with the stator, encircling the output shaft, and having a plurality of circumferentially arranged ring pins,
an eccentric cam received on the output shaft, and
a cycloidal disc defining a central hole that receives the eccentric cam and a plurality of lobes circumferentially arranged around an outer surface of the disc and configured to engage with the ring pins; and
a cycloidal differential having a case rotationally coupled to the cycloidal disc.

10. The electric powertrain of claim 9, wherein the cycloidal disc defines a plurality of circumferentially arranged holes, and wherein the cycloidal differential includes a case having a plurality of circumferentially arranged pins that are received in the holes.

11. The electric powertrain of claim 10, wherein the pins are integrally formed with the case.

12. The electric powertrain of claim 9, wherein the cycloidal differential includes:
a first cycloidal drive having a first input member rotationally fixed to the case and a first differential output configured to connect with a first half shaft,
a second cycloidal drive having a second input member rotationally fixed to the case and a second output member configured to connect with a second half shaft, and
a coupling element connected between the first and second drives.

13. The electric powertrain of claim 9, wherein the cycloidal differential further includes first and second cycloidal discs connected to respective first and second differential outputs.

14. The electric powertrain of claim 13, wherein the traction motor, the cycloidal speed reducer, and the differential are coaxial, and the second differential output extends through a bore of the output shaft.

15. The electric powertrain of claim 13, wherein the first and second cycloidal discs define a plurality of lobes circumferentially arranged around outer surfaces of the discs, wherein the first disc has m number of lobes, and the second disc has m+1 number of lobes.

16. The electric powertrain of claim 13, wherein the first cycloidal disc defines a circumferential arrangement of holes, and the cycloidal differential further includes a circumferential array of pins that are disposed in the holes of the first cycloidal disc.

17. An electric axle comprising:
a traction motor including a motor output shaft;
a cycloidal speed reducer coupled to the motor output shaft and including a cycloidal disc configured to have an eccentric, cycloidal motion that rotates slower than the motor output shaft; and
a cycloidal differential including a case connected to the cycloidal disc and first and second differential output shafts.

18. The electric axle of claim 17 further comprising:
a first half shaft connected to the first differential output shaft; and
a second half shaft connected to the second differential output shaft.

* * * * *